May 12, 1970  M. VOLLENWEIDER ET AL  3,510,899

VEHICLE WASHING INSTALLATION

Filed Oct. 2, 1967  3 Sheets-Sheet 1

INVENTORS:
MAX VOLLENWEIDER &
ERWIN REMUND
By Jacobi & Richardson
attorneys

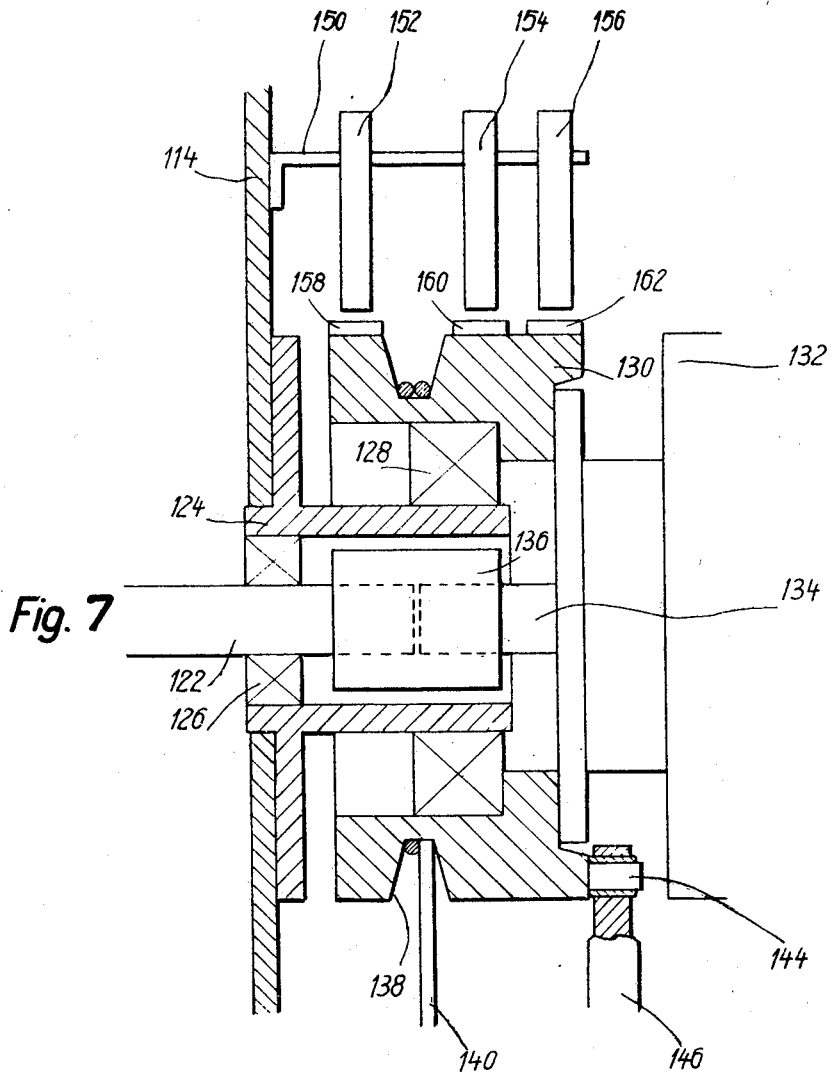

United States Patent Office 3,510,899
Patented May 12, 1970

3,510,899
VEHICLE WASHING INSTALLATION
Max Vollenweider and Erwin Remund, Horgen, Switzerland, assignors to Sam Vollenweider AG, Horgen, Switzerland, a corporation of Switzerland
Filed Oct. 2, 1967, Ser. No. 672,087
Claims priority, application Switzerland, Oct. 6, 1966, 144,521/66; Mar. 22, 1967, 4,085/67
Int. Cl. B60s 3/06; A46b 13/02
U.S. Cl. 15—21                                    6 Claims

ABSTRACT OF THE DISCLOSURE

A car washing installation having a travelling frame or gantry movable lengthwise relative to the automobile to be washed. The travelling gantry supports carriage means mounted to be elevationally displaceable, and a roller brush means is carried by the carriage means for rotation about a substantially horizontal axis. Separate drive means serve for displacing the travelling gantry and for elevationally displacing the aforesaid carriage means. Additionally, means are provided for movably mounting the roller brush means at the carriage means to possess an additional degree of freedom of movement, and return means serve to restore the roller brush means into its normal position. Switch means coupled with both of the drive means and operably associated with the roller brush means control the elevational displacement of the carriage means and the travelling motion of the travelling gantry as a function of the deflection of the roller brush means taking place within the aforesaid degree of freedom of movement and against the action of the return means.

BACKGROUND OF THE INVENTION

The present invention pertains to an improved vehicle or car washing installation. In the context of this description the term automobile or car is used in its broader sense to include practically any type vehicle which can be cleaned by means of the inventive car washing installation.

Car wash installations are already known to the art wherein a travelling gantry or frame, which is movable relative to the vehicle, supports one or more movably arranged, rotating roller brushes. These known installations do not exhibit any great problems during the automatic cleaning or washing of the sides of the vehicle by means of such roller brushes. However, difficulties do crop up only during the cleaning of the markedly stepped upper surface and the front and rear of the vehicle. In these instances, the brushes which serve for this purpose and which generally rotate about a horizontal axis, must be adjusted to the changing profile in that such brushes are elevationally displaced—sometimes even during stopping of the longitudinal movement of the travelling frame or grantry.

SUMMARY OF THE INVENTION

Accordingly, the present invention is concerned with the construction of an improved car wash installation wherein the control of the brushes is undertaken in a particularly simple and advantageous manner in order to follow along the profile of the vehicle to be cleaned.

Another, more specific object of this invention pertains to an improved car wash installation which is relatively simple in construction, extremely reliable in operation and not readily subject to breakdown, and is capable of automatically cleaning the vehicle notwithstanding abrupt changes in its profile.

Now, in order to implement these and still further objects of the invention, which will become more readily apparent as the description proceeds, the inventive car washing installation incorporates a travelling gantry or frame which is relatively movable in lengthwise direction with respect to the vehicle or automobile which is being washed. This travelling gantry is equipped with an elevationally displaceable carriage means which carries at least one roller brush means rotatable about a horizontal axis. A separate drive motor is provided for the gantry movement and for the elevational displacement of the carriage means. According to an important aspect of the invention the roller brush means is mounted at the carriage means so as to possess an additional degree of freedom of movement and return means are provided in order to restore the roller brush means into its normal position. Additionally, switch means coupled with the drive motors are operably associated with the roller brush means in order to control the elevational displacement and the gantry motion as a function of the deflection of the roller brush means which takes place within this degree of freedom of movement against the action of the return means.

Owing to the provision of an additional degree of freedom of movement for the roller brush means and its cooperation with the switch means the roller brush means simultaneously functions as a feeler member which controls the movements which are necessary for having the roller brush means follow along the profile of the vehicle. This additional degree of freedom of movement can also be utilized for simplifying the control means in that, for the deflecting motion there is selected one having a horizontal and/or a vertical component. During an abrupt change in profile, for instance when arriving at the windshield, this enables the roller brush means to deviate or escape without having to also positively transmit a control impulse. Consequently, it its readily possible to dispense with driving the travelling frame at different speeds. Instead of this, the control means can result in an interruption of the movement of the traveling gantry, so that the installation costs can be reduced.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIG. 7 is an enlarged cross-sectional view of the installation depicted in FIG. 5, taken along the line VII—VII thereof.

DESCRIPTION OF THE PREFERRED EMBODIMENTS

Figure 1:
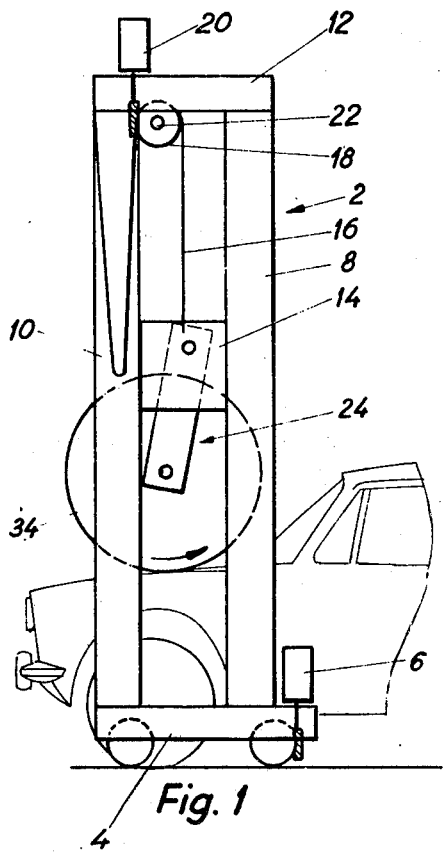
FIG. 1 shows an exemplary embodiment of inventive vehicle or car washing installation in elevational view.

Describing now the drawings, it will be seen that in FIG. 1 reference numeral 2 designates a travelling gantry or frame which is equipped at both sides or ends with an undercarriage 4, the drive of which takes place through the intermediary of a suitable electric motor 6. The gantry colums 8 and 10 which are supported at both sides of the undercarriage 4 and which are interconnected with one another by means of a crosspiece 12, guide between themselves a vertically movable carriage means formed by two plate members 14, only one of which has been conveniently depicted in FIGS. 1 and 3. These plate members 14 are operatively connected via traction cables 16 with cable drums 18. Further, a suitable electric motor 20 is in driving relation with the cable drums 18 which are interconnected with one another by means of a shaft 22. This shaft 22 is mounted in a suitable manner at the crosspiece 12.

Figure 3:
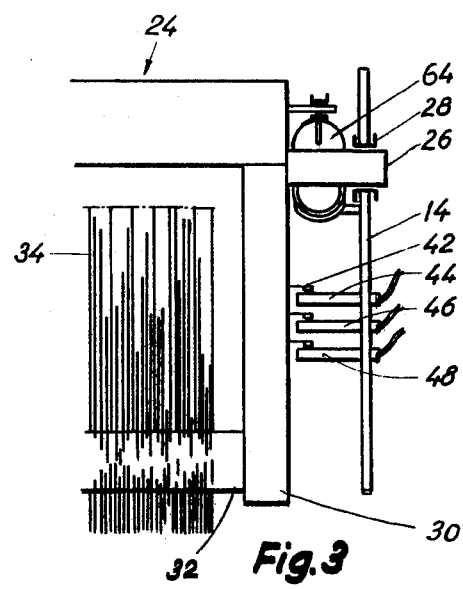
FIG. 3 is a side view of the detail shown in FIGURE 2.

Continuing, and as will be best recognized by inspecting FIG. 3, a yoke 24 is pivotably supported by means of a respective stub shaft or journal 26 in the bearings 28 of the confronting plate members 14 and carries between its arm members 30 a shaft member 32. A roller brush means 34 is mounted upon the shaft member 32. The latter is operatively associated with a non-illustrated drive motor, which, for instance, can be arranged in one of the arm members 30.

Figure 2:
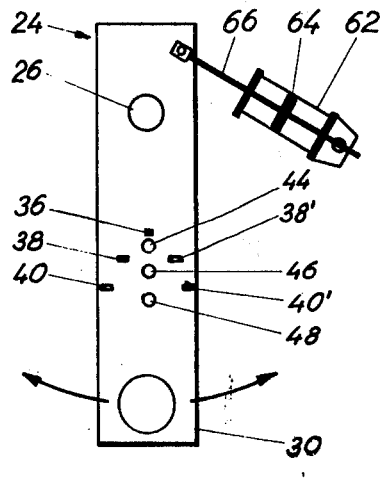
FIG. 2 is an enlarged view depicting a detail of the car wash installation shown in FIGURE 1.

FIGS. 2 and 3 further make it apparent that the one one arm member 30 carries five switching magnets, designated by reference numerals 36, 38 and 38' and 40 and 40', at the side thereof which faces the associated plate member 14. These five permanent magnets 36, 38, 38', 40 and 40' which are each secured by means of a support member 42 at the aforementioned arm member 30, collectively form the configuration of a V, with the magnet 36 being located at the apex and the magnets 38 and 40 and 38' and 40' in the two legs of this V-configuration. These magnets 36, 38, 38', 40, and 40' serve to cooperate with three Reed switches 44, 46 and 48. The Reed switches 44, 46 and 48 are distributively arranged along a vertical line and secured to the associated plate member 14 and are operatively coupled in the control current circuit for the drive motors 6 and 20. More precisely, it should be understood that the magnet 36 is associated with the switch 44, whereas the magnets 38 and 38' cooperate with the switch 46 and the magnets 40 and 40' with the switch 48.

Figure 4:
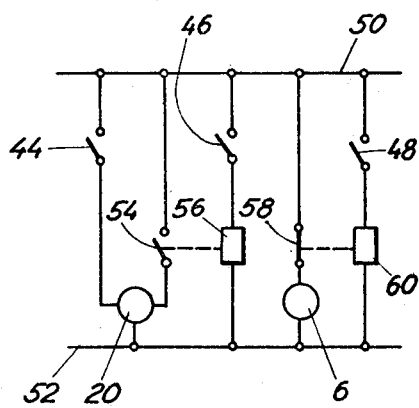
FIG. 4 is a schematic circuit diagram of the control means for the drive.

FIG. 4 depicts an exemplary embodiment of the control circuit which can be used with the inventive car wash installation. Accordingly, it should be recognized that reference numeral 50 and 52 represent both of the network conductors between which the drive motors 6 and 20 are operatively coupled. The drive motor 20 which can be reversed in polarity, is connected on the one hand via the switch 44 with the conductor 50, and, on the other hand, via the work contact 54 of a time relay 56 with this conductor 50. The relay 56 which is electrically coupled with the conductor 52 is connected via the switch 46 with the conductor 50. On the other hand, a rest contact 58 of a time relay 60 is situated between the conductor 50 and the drive motor 6. This time relay 60 is connected by means of the switch 48 with the conductor 50.

Additionally, it will be recognized that a dampening cylinder 62 is hingedly connected with the plate member 14, and the piston 64 thereof is pivotably connected via a piston rod 66 with the arm member 30.

During operation, the current circuit of FIG. 4 is switched in by means of a non-illustrated manual switch. Since the rest contact 58 is closed—the relay 60 is not energized owing to the open switch contact 48—the drive motor 6 is placed into operation and drives the undercarriage 4. As a result, the travelling frame of gantry 2 moves towards the front end of the vehicle or car which has been schematically depicted in FIG. 1. At the same time current is applied to the drive motor 20 since the arm member 30 of the yoke 24 assumes its vertical neutral position of FIG. 2 and the switch magnet 36 thereby retains closed the switch contact 44 which is located within its operable zone. The drive motor 20 thus lowers the carriage means formed by the plate members 14 and therefore the yoke 24 with the rotating roller brush means 34, until the latter arrives at the front of the vehicle owing to the forward motion of the traveling gantry 2. In so doing, the yoke 24 is now rocked rearwardly. The switch 44 is opened owing to the spacing apart of the switch magnet 36 and the drive motor 20 is stopped. Directly thereafter the switch 46 arrives at the operating zone of the switch magnet 38', since the yoke 24 continues to rock in clockwise direction due to the forward movement of the travelling gantry 2. The time relay 56 is energized since the switch 46 is closed. Upon expiration of a predetermined period of time such now closes the work contact 54, so that the drive motor 20 begins to rotate in the opposite direction and raises the yoke 24 together with the roller brush means 34. Since, however, the pivoting of the yoke 24 has proceeded further owing to the continuous forward movement of the travelling frame or gantry 2, the swtich 48 is thus switched in and the relay 60 is energized. Energization of relay 60 brings about opening of the rest contact 58 with a certain time delay. Consequently, movement of the gantry 2 is interrupted. Since the switch 46 is still held closed by the switch magnet 38', the raising motion of the yoke 24 and the raising of the roller brush means 34 continues during standstill of the gantry 2 and with simultaneous rocking motion in counter-clockwise direction until the roller brush means 34 arrives at the height of the car hood. In the meantime, the switch magnet 40' has become ineffective, so that the contact 58 closes due to deenergization of the relay 60 and the drive motor again drives the travelling gantry 2.

During the further pivoting of the yoke 24 in counter-clockwise direction towards the neutral position the switch 46 has also opened, so that the drive motor 20 is brought to standstill. The roller brush means 34 only moves over the slightly ascending motor or vehicle hood, whereby the yoke 24 slowly again rocks in counterclockwise direction. Upon arriving at the windshield of the vehicle the roller brush means 34 rocks the yoke 24 further in counterclockwise direction. Consequently, the switch 46 is closed and the drive motor 20 is placed into operation by means of the contact 54 with an appropriate time delay. As a result, the carriage means 14, 14 with the roller brush means 34 is again raised. If the roller brush means 34 arrives at the rear edge of the roof of the car after passing across the car roof or if such is released by the car roof, then the yoke 24 returns back into its neutral position and the switch 44 is closed by the magnet 36. The carriage means 14, 14 is lowered by the drive motor 20, so that the roller brush means 34 can now wipe across the rear window of the vehicle. During cleaning of the vehicle in the reverse direction of movement of the travelling gantry 2 the roller brush means 34 functions in analogous manner as a feeler member, whereby, however, now the switch magnets 38 and 40 become effective since the deflection of the yoke 24 is primarily undertaken in clockwise direction.

Instead of using a pivotal yoke it would also be possible to employ a yoke which could be horizontally displaced or one which could be displaced at an inclination. Likewise, it would be possible to thereby impart to the roller brush means a further degree of freedom of movement so that such together with its drive motor could rotate through a certain angle and indeed about an axis which coincides with the axis of rotation.

Figure 5:
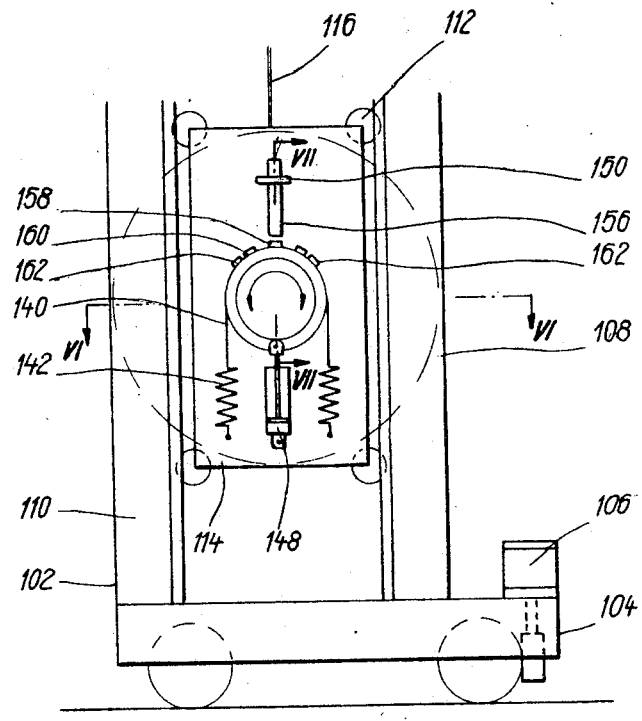
FIG. 5 is a schematic elevational view of a second embodiment of inventive automobile or car washing installation.
Figure 6:
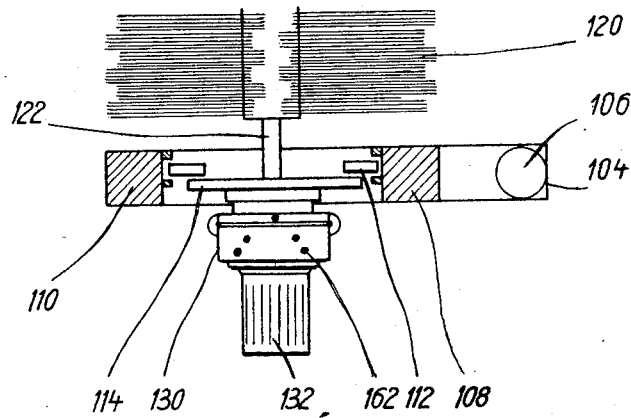
FIG. 6 is an enlarged cross-sectional view of the installation shown in FIG. 5, taken along the line VI—VI.

Now, in FIGS. 5–7 there is depicted an embodiment of car washing installation which functions according to this principle. By referring to these figures, it will be understood that the gantry frame is designated by reference numeral 102 and is equipped at both sides with an undercarriage 104 which enables the gantry frame 102 to be propelled in both directions past the vehicle to be cleaned by means of a suitable drive motor 106. At each side of the travelling gantry 102 there are arranged two gantry columns 108 and 110 which bear upon the associated undercarriage 104. Between these gantry columns 108 and 110 there is guided for vertical movement a carriage means 114 which is mounted upon rollers 112. The carriage means 114 is held by means of a traction cable 116 which can be raised or lowered through the agency of a non-illustrated cable pulley or drum driven by a suitable electric motor, similar to the arrangement previously considered in connection with FIGS. 1–4 inclusive. The control of the likewise non-illustrated electric motor as well as the drive motor 106 for the movement of the travelling gantry 102 takes place similar to the first embodiment as a function of the deflection of the roller brush means 120 during its movement past the vehicle.

The roller brush means 120, which is mounted upon a shaft 122, is mounted at both ends in the vertically displaceable or moveable carriages 114. These carriages 114 are in operable association with one another only through the intermediary of the corresponding traction cables 116 and their commonly driven cable drum. As best evident by inspecting FIG. 7, each carriage member 114 carries a bearing sleeve 124 at its external side and into which the corresponding end of the shaft member 122 extends, whereby the shaft end is supported in a bearing 126. Although the bearing 126 is arranged within the bearing sleeve 124, it carries at its outside a bearing 128. A drum member 130 rotatably bears upon the bearing sleeve 124 through the agency of the bearing 128 and therefore upon the carriage or carriage means 114. At the front end of the drum member 130 there is flanged or otherwise connected a suitable electric motor 132 with its housing in order to drive the roller brush means 120. The shaft 134 of this electric motor 132 extends through the drum member 130 into the bearing sleeve or bushing 124. A coupling member 136 operably interconnects the shafts 134 with the shaft 122 of the roller brush means 120.

The drum member 130 is provided with a peripheral groove 138 in which there is situated a wire cable 140. Both ends of the wire cable 140 which is wrapped around the drum 130 and is connected at least for frictional contact therewith, are under the action of pre-stressed tension springs 142 (FIG. 5), which are secured to the carriage means 114.

The housing of the electric motor 132 carries a bolt member 144 at which there engages the piston rod 146 of a hydraulic dampening cylinder 148. This dampening cylinder 148 is hingedly connected with the carriage means 114. At a stirrup or bracket 115 this carriage means 114 supports three magnetic switches 152, 154, and 156 which are arranged in an axial plane of the drum member 130. Cooperating with these magnetic switches 152, 154, and 156 are permanent magnets 158, 160, and 162 respectively, which are secured to the periphery of the aforesaid drum member 130.

Without delving into greater detail regarding the electrical control means for the car washing installation and with which the magnetic switches 152, 154, and 156 are operably associated, it is mentioned that the magnetic switch 152 together with the magnetic switch 154 are associated with the electric motor which raises or lowers, by means of the tension cable 116, the carriage means 114. On the other hand, the magnetic switch 156 is operably associated with the drive motor 106 for bringing about displacement of the travelling gantry 102.

During operation of the car washing installation the roller brush means 120 is driven by the motor 132 in clockwise direction for instance, whereas the travelling gantry 102 is displaced from the left towards the right of FIG. 5 and at the same time the carriage means 114 is lowered. Owing to the rotatable mounting of the drive motor 132 with respect to the carriage means 114 the reaction moment becomes effective at the drum member 130. However, this drum member 130 is not rotated due to the springs 142 for such length of time as such only has to absorb a moment which corresponds to the no-load or idling rotational moment of the roller brush means 120. However, if the roller brush means 120 comes into contact with the surface of the car or vehicle which is to be cleaned, during the washing operation, then it will be braked owing to the brush friction at this surface. The reaction moment which increases in accordance with the drive rotational moment now brings about a rotation of the drum member 130 in counterclockwise direction. In so doing, whereas the magnet 158 becomes ineffective at the switch 152 so that, for instance, the carriage means 114 is stopped, with further rotation of the drum 130, the corresponding magnet 160 which is arranged in offset fashion in the peripheral direction becomes effective at the switch 154. This brings about for instance an upward movement of the carriage means 114 for such length of time as the rotational moment does not decrease. On the other hand, if the rotational moment increases, then the stronger rotation of the drum member 130 also brings about an actuation of the switch 156 through the corresponding magnet 162, so that for instance the motor 106 is stopped with a predetermined time delay.

The movement of the roller brush means in space, that is to say, the movement of the travelling gantry and the carriage means is accordingly controlled by the deflection or rotation of the drum member which corresponds to a relative rotation of the roller brush means, and specifically in such a manner that a predetermined rotational moment is not exceeded. Therefore, it is possible to carry out a protective cleaning of the vehicle by means of the car washing installation and more specifically the roller brush means.

Accordingly, what is claimed is:

1. A car washing installation comprising, in combination,
 (a) a travelling gantry which is movable in lengthwise direction relative to the automobile to be washed;
 (b) carriage means mounted to be elevationally displaceable at said travelling gantry;
 (c) a roller brush means carried by said carriage means for rotation about a substantially horizontal axis;
 (d) drive means for displacing said travelling gantry;
 (e) drive means for elevationally displacing said carriage means;
 (f) means for movably mounting said roller brush means at said carriage means to possess an additional degree of freedom of movement;
 (g) return means for restoring said roller brush means into its normal position;
 (h) switch means coupled with both of said drive means and operably associated with said roller brush means in order to control the elevational displacement of said carriage means and the travelling motion of said travelling gantry as a function of the deflection of said roller brush means taking place within said degree of freedom of movement and against the action of said return means; and
 (i) a dampening mechanism for the deflecting movements of said roller brush means.

2. A car washing installation comprising, in combination,
 (a) a travelling gantry which is movable in lengthwise direction relative to the automobile to be washed;
 (b) carriage means mounted to be elevationally displaceable at said travelling gantry;
 (c) a roller brush means carried by said carriage means for rotation about a substantially horizontal axis;
 (d) drive means for displacing said travelling gantry;
 (e) drive means for elevationally displacing said carriage means;
 (f) a drive motor coupled to said roller brush means and mounted for relative rotational displacement with respect to said carriage means, said drive motor being rotationally displaced from a normal position in response to a workload effective at said roller brush means;

(g) return means connected to said drive motor and acting to restore said drive motor towards its normal rotational position with respect to said carriage means against said workload effective at said roller brush means, whereby the rotational displacement of said drive motor is a function of said workload; and, (h) switch means coupled with both of said drive means and operably associated with said drive motor in order to control the elevational displacement of said carriage means and the travelling motion of said travelling gantry as a function of the rotational displacement of said drive motor against the action of said return means to thereby relieve said roller brush means from an excessive workload.

3. A car washing installation as defined in claim 2, wherein said drive motor includes a motor housing which is rotatably mounted at said carriage means, said drive motor being disposed substantially coaxial with respect to said roller brush means.

4. A car washing installation comprising, in combination,
   (a) a travelling gantry which is movable in lengthwise direction relative to the automobile to be washed;
   (b) carriage means mounted to be elevationally displaceable at said travelling gantry;
   (c) a roller brush means carried by said carriage means for rotation about a substantially horizontal axis;
   (d) drive means for displacing said travelling gantry;
   (e) drive means for elevationally displacing said carriage means;
   (f) means for movably mounting said roller brush means at said carriage means to possess an additional degree of freedom of movement;
   (g) return means for restoring said roller brush means into its normal position;
   (h) a support member rotatably mounted at said carriage means, the axis of rotation of said support member coinciding with the axis of rotation of said roller brush means, said drive motor being secured to said support member; and
   (i) switch means coupled with both of said drive means and operably associated with said support means in order to control the elevational displacement of said carriage means and the travelling motion of said travelling gantry as a function of the rotational movement of said support means as transmitted by said roller brush means.

5. A car washing installation as defined in claim 4, further including a dampening mechanism operably engaging with said support member for dampening the deflecting movements of said roller brush means, said return means operably engaging with said support member, said switch means being secured to said carriage means, and actuating means carried by said support member for actuating said switch means.

6. A car washing installation as defined in claim 4, wherein said switch means includes a plurality of switches spaced apart along the periphery of said support member, and a plurality of cooperating switch elements each associated with the path of travel of one of said switches.

References Cited

UNITED STATES PATENTS

| | | |
|---|---|---|
| 3,233,264 | 2/1966 | Nickl et al. |
| 3,060,473 | 10/1962 | Vani. |
| 3,090,981 | 5/1963 | Vani et al. |
| 3,292,192 | 12/1966 | Maxwell. |

FOREIGN PATENTS

| | | |
|---|---|---|
| 1,434,676 | 2/1966 | France. |
| 1,247,887 | 8/1967 | Germany. |

EDWARD L. ROBERTS, Primary Examiner

U.S. Cl. X.R.

15—53